Oct. 24, 1944. J. T. BEECHLYN 2,360,928
PERMANENT MAGNET CHUCK
Filed Feb. 7, 1941 2 Sheets-Sheet 2
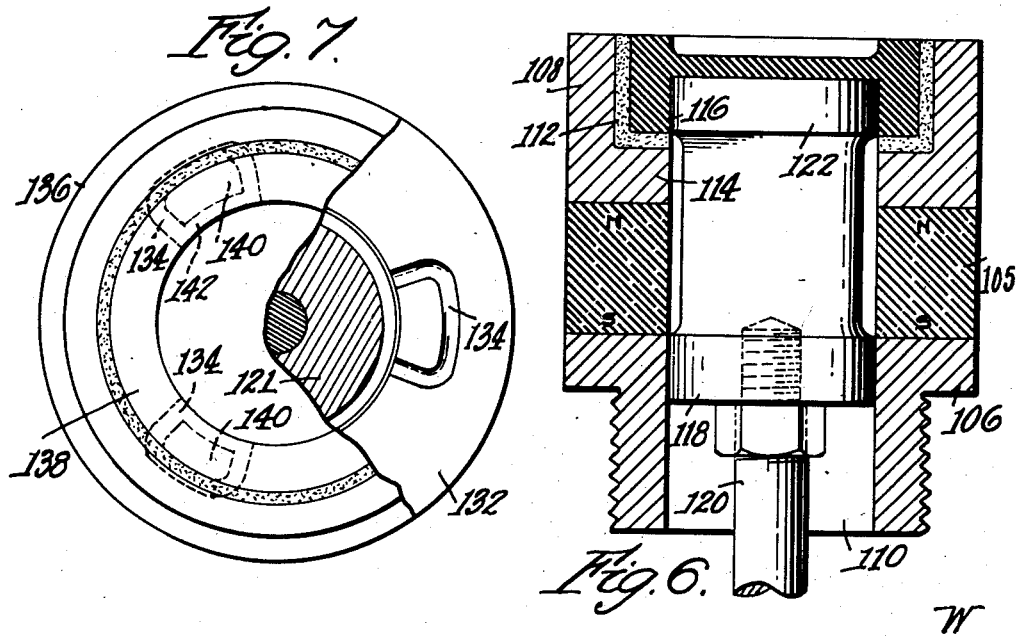
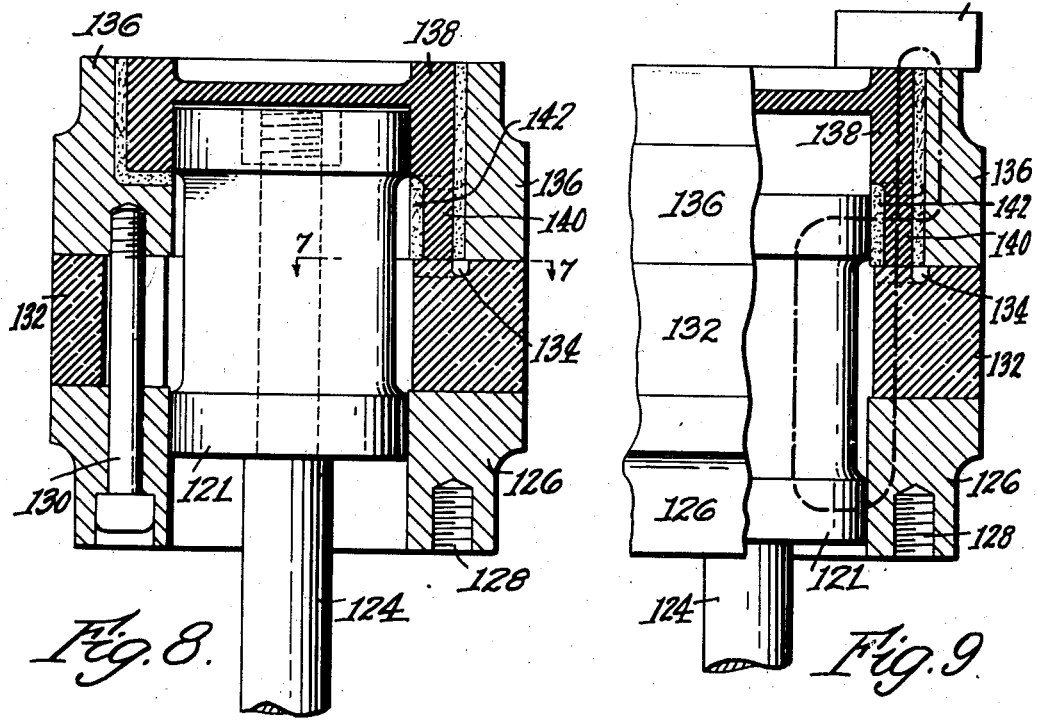
Inventor
John T. Beechlyn
By attorney
Charles R. Fay Patented Oct. 24, 1944

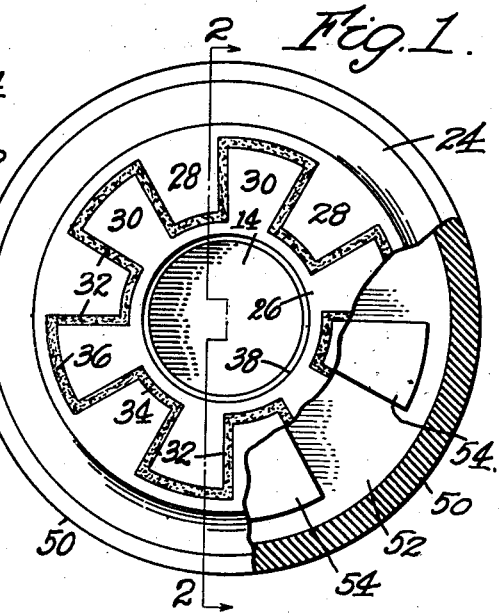
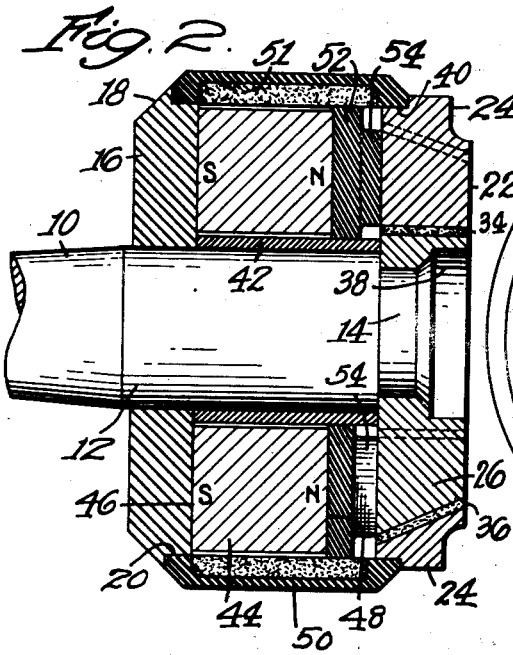
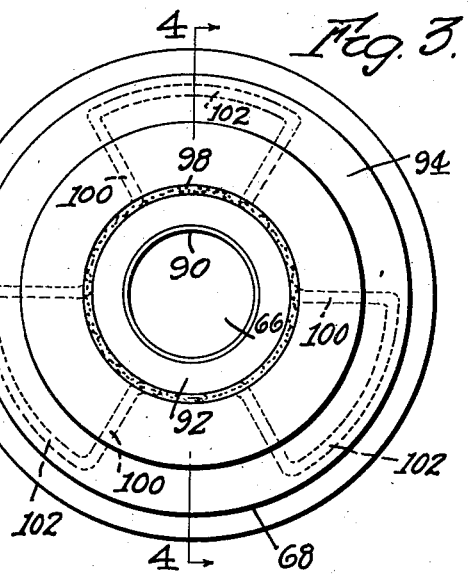
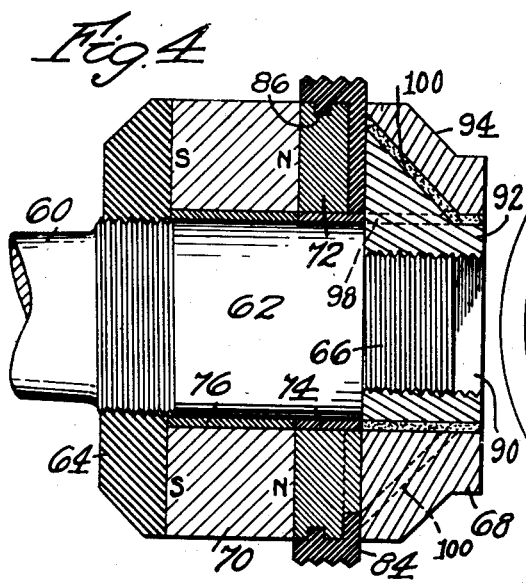
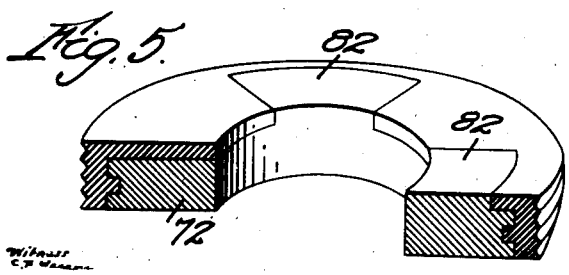

2,360,928

UNITED STATES PATENT OFFICE 2,360,928

PERMANENT MAGNET CHUCK

John T. Beechlyn, Worcester, Mass., assignor to O. S. Walker Co. Inc., Worcester, Mass., a corporation of Massachusetts Application February 7, 1941, Serial No. 377,864

15 Claims. (Cl. 175—367)

This invention relates in general to permanent magnetic chucks and more particularly to such chucks of the round or rotary type.

Objects of the invention include the provision of a simple and inexpensive permanent magnet rotary chuck adapted to be used in lathes, grinding machines, etc., wherein the chuck will rotate on its axis to hold centered work; the provision of a rotary chuck in which a single annular magnet is used to provide the work holding flux; the provision of a rotary chuck in which an annular magnet is supported on a central spindle and is provided with a magnetic valve rotatably mounted on the spindle for rendering the magnet effective for holding or releasing the work; the provision of a more rigid and stronger work holding plate obtained by coating the pole pieces at the gaps with soft tin, and utilizing a hardened tin alloy for filling the gaps, whereby the hardened tin will alloy with the soft tin to produce a uniform hard, strong gap construction; and the provision of a rotary permanent magnet chuck of new construction and improved holding power, in which the chuck parts may be held together by the attraction of the magnet, the parts being supported on a central spindle which acts as a return circuit for the flux.

Other objects and advantages of the invention will appear hereinafter.

Reference is to be had to the accompanying drawings, in which

Fig. 1 is a front view of one form of a chuck embodying the present invention, and showing the work holding plate, with parts broken away to illustrate the magnetic valve ring to turn the flux on and off as to work holding effect;

Fig. 2 is a section taken on line 2—2 of Fig. 1;

Fig. 3 is a front view of another form of the invention;

Fig. 4 is a section on line 4—4 of Fig. 3;

Fig. 5 is a perspective and sectional view of the magnetic valve ring used in the form of the invention shown in Fig. 4;

Fig. 6 is a central sectional view of a chuck according to the present invention adapted for automatic control;

Fig. 7 is a front view of another form of the invention with part in section as on line 7—7 of Fig. 8;

Fig. 8 is a central sectional view through the device of Fig. 7; and

Fig. 9 is a broken view similar to Fig. 8 but showing the parts in work release position.

Referring to Figs. 1 and 2, it will be seen that it has been chosen to illustrate this invention as applied to a tapered pin or arbor 10 which is adapted to be held in a head stock of a lathe, for example. Other supports might easily be used, as a bolt for use with slotted face plates, or the tapered arbor could be omitted and the chuck used as a flat work holder. In any case, as illustrated, the arbor 10 is provided with a straight cylindrical member 12 of iron and this member has a reduced threaded or headed over member 14 integral therewith for a purpose to be described.

A circular, parallel-sided iron plate 16 having a central aperture fitting the cylindrical member 12 is positioned as shown in Fig. 2 adjacent the taper at 10 and remote from the member 14. This plate is beveled on one edge as at 18 and has an annular recess at 20, and is adapted to closely engage member 12 at the aperture, having a turning fit therewith.

A two-part annular work holding plate 22 is made up of an outer iron member 24 and an inner iron member 26. These members have complementary tapered slots, interiorly of member 24 and exteriorly or peripherally of member 26, so that tapered iron pieces 28, 30, respectively, are produced, to interfit in continuous spaced relation as clearly shown in Fig. 1. The space is utilized as a gap and is filled with non-magnetic material 32, thus permanently holding the parts together. It is to be particularly noted that this gap is parallel and concentric with member 12 at the innermost portions 34, see Fig. 2, but the outermost portions at 36 extend at a considerable angle to member 12, as also shown in Fig. 2, while still being concentric. Part 26 is apertured and countersunk as at 38, Fig. 2, to fit and be secured to member 12 by the reduced member 14. By this means, plate 22 is secured concentrically to member 12, and part 24 has a peripheral recess 40, while a central recess is provided for use in working hollow members or rings.

A non-magnetic brass or other sleeve 42 surrounds member 12 and besides providing a gap, this sleeve spaces plates 16 and 22, holding them apart. An annular magnet 44 of large section, and magnetized to have its poles on opposite flat faces 46, 48, respectively, is arranged about sleeve 42 and may be slightly spaced therefrom as well as from an iron flat ring 50 having circular corners to fit the recesses 20, 40, as shown. This ring spans the space between plates 16 and 22, and conceals the magnet, and is interiorly recessed to provide a gap 51 which may be filled by a non-magnetic material. It will be seen that the magnetic section of ring 50 is very small compared to that of either member of the plate 22.

The remaining element of this construction is the valve comprising an annular iron piece 52 having a flat surface adjacent pole face 48 of the magnet and extending between sleeve 42 and flat ring 50. Flat lands 54 shaped to correspond to pieces 28, 30 rise from the other surface of the piece 52 and these lands are spaced corresponding distances, see Fig. 1. The tops of the lands are arranged to bear on the interior surfaces of the iron pieces 28, 30, and are of a size to correspond to these interior surfaces.

In the operation of the device, the tapered arbor may be held in a head stock, so that the exterior flat face of the combined member 24, 26 extends toward the tail stock, and forms the work holding surface. If the iron piece 52 be turned on sleeve 42 to a position where the lands 54 align with the iron pieces 28, flux from the magnet 44 will pass through member 24 into a work piece on the chuck, and thus over gap 32 at all points of the latter. The flux will then pass into member 26, thru 14, 12, 16 and complete the magnetic circuit to the magnet. If, however, the member 52 is turned relatively to plate 22 so that lands 54 align with iron pieces 30, the flux will pass directly into member 14 without traversing gap 32, so that any work piece on the holding plate will be released. It is to be especially noted that ring 50 comprises a means for the relative turning of the parts, and this ring can be secured to plate 22, or to member 52 for the relative turning, so that either the plate or member is turned, or the ring may be utilized to secure member 52, the magnet, and plate 16 as a unit for turning action. Any of these effects may be obtained with the construction described, merely by correct use of pins or by shrinking certain members onto others, and all or any of the annular parts may be made to turn on adjacent parts. Incidentally, all the parts are constantly urged together in an axial direction under influence of the magnet, so that the spacing effect of sleeve 42 becomes of some importance in leaving member 52 free to turn. Also, if bolts are used in place of the tapered arbors, two or three chucks may be secured to a single slotted face plate so that large rings may be held for light grinding operations.

The magnetic effect of turning ring 50 is to provide a constant path for a small flux thru the work in a direction opposite to the direction of the holding flux, so that a partial demagnetization of the work is obtainable in much the same manner as disclosed in my co-pending application, Serial No. 371,518, filed December 24, 1940.

Referring now to Figs. 3, 4, and 5, a modified construction is illustrated wherein it is intended that only the valve piece shall turn. The tapered arbor 60 is similar to arbor 10 but the cylindrical member 62 is threaded to receive the plate 64, and reduced member 66 is likewise threaded to secure the work holding plate 68, so that the magnet 70 and iron valve 72 are secured in position in addition to the inter-attraction of all the parts caused by the magnet.

A short non-magnetic sleeve 74 underlies the valve member 72 and an aligned like sleeve 76 underlies magnet 70. Otherwise, the end plate 64 and magnet 70 are greatly similar to the corresponding parts in Fig. 2, but the ring 50 is omitted and the valve and work holding plate 68 are of modified construction.

Valve 72 comprises an iron annulus having lands 82 similar to those at 54, but instead of being free, lands 82 have non-magnetic material cast therebetween, and this material is arranged to extend out radially beyond the iron piece at 84 and is peripherally knurled to present a hand grip whereby the valve may be turned on sleeve 74. A series of grooves 86 is provided to interlock the cast metal, which may contain antimony to harden it. The reason for using a non-magnetic material for the hand grip is to prevent the collection of chips and sludge between the plate 68 and magnet as would occur in the absence of a gap at the periphery of the valve.

In this modification, there is no demagnetizing flux as is occasioned by ring 50 in Fig. 1, but in some cases it is desired to dispense with such demagnetizing effect.

The work holding plate 68 is centrally bored and threaded to be secured to member 66, leaving a central recess 90. This plate is made up of two parts like plate 22, but in the case of the plate shown in Figs. 3 and 4, both inner part 92 and outer part 94 are annular at the work surface, having a continuous annular gap therebetween. This gap is cylindrical at portions 98, aligning with sleeve 74, but between portions 98, the gap extends angularly thru the plate as at 100 and forms arcs 102 at its widest extent, which align with the valve part 84. Thus, in effect, plate 68 presents spaced interfitting iron wedges to the valve 72, but the work surface comprises a pair of spaced concentric members. When lands 82 are aligned with the extending iron pieces on member 92, the flux passes directly into member 66, but when the lands align with the wedges integral with exterior member 94, the flux must traverse the gap and thus pass thru any work piece on the plate.

Where a magnetic holder is used for precision work, it is essential that the spaced poles in the holding surface be rigidly secured against any displacement, and the structure be impervious to liquids used as coolants or lubricants. To meet these requirements, it has been the practice to fill the gaps between poles with a low-fusing expansion alloy, such as type-metal. However, none of these priorly used methods has been found thoroughly reliable under all circumstances, and the present construction overcomes this difficulty by providing an adhering metallic bond directly between the spacing material and the ferric surfaces facing the gap. In the application of this method, reliance is placed on the metal tin, on account of its good alloying properties. However, neither pure tin nor a mixture of tin and lead is suitable as a spacing material because of their softness.

Hardening agents, such as antimony, bismuth or arsenic may be added to either or both of these metals, but such admixture greatly impairs the contact alloying properties with respect to an iron surface. It has been found, however, that such a hardened metal will readily alloy with solder or tin that already is in an adhering alloyed condition with an iron surface, and that this blending can take place without breaking the priorly established bond with the iron.

Accordingly, the procedure involves as a first step the tinning of the pole pieces on all surfaces bordering the magnetic gaps. The pieces are then placed and held in their properly spaced relation, and the assembly heated to a degree that at least approaches the melting point of the tin. A well heated hardened tin alloy is then poured into the intervening spaces in which process fluxes or acids may be applied to exclude oxidization.

After solidification, such an assembly will present a structure of great strength and rigidity, having metallic continuity and being impervious to fluids. The best results are obtained by using as a filling an alloy of pure tin and about 10 percent of antimony which produces a hard silvery metal, known in other arts as "Britannia" metal. However, a considerable lead content may be added, with the object of lowering cost, although such addition will increasingly make it more difficult to maintain the bond with the iron.

Applied to the present device, it will be evident that this construction will produce a firmly coherent and rigid top plate 22, without dependence on locking contours or lateral pinning. Likewise, the method may be applied in the making of the valve plate 72, where the non-magnetic portions 84 may be cast in a mould into adhering contact with ferric portions 72, by the use of the above described tinning and tin alloy method.

Referring now to Fig. 6, illustrating a form of the present invention adapted for the automatic or machine control of the valve, there is shown an annuar magnet 105, having poles on its opposite faces, an iron base 106, and a two-part work holding plate 108, the magnet, base, and plate being held together by any desired means such as bolts or by the magnetic attraction of the parts. The iron base may be screw threaded or otherwise constructed for attachment to a machine, and is apertured as at 110 in alignment with the aperture in the magnet. A gap 112 separates the parts of the work holding plate, these parts being concentric. The outer part has an internal flange 114 extending below the inner part, and the latter is countersunk as at 116, so that the gap 112, which follows the inner contour of the outer part divides the plate 108 at the periphery of the countersink.

A cylindrical magnetic conducting valve 118 is mounted on a rod 120 for reciprocal motion in the device. Flanges 122 center and guide the valve besides acting as magnetic connectors, and the annular recess between flanges provides a gap so that the valve does not contact the magnet. Suitable stops may be utilized to restrict the reciprocatory range of the valve, and rod 120 may be actuated by any desired control mechanism to hold and release work on the work plate.

Figs. 7, 8, and 9 disclose a modification of the construction shown in Fig. 6, wherein a reverse flux circuit for total release effect is provided. In this instance, valve 121 is similar to valve 118, but is shown mounted in a different manner on a rod 124, which is adapted to be used like rod 120. An iron base plate 126, which may be secured to a machine or moving head of any kind as by tapped holes 128, is provided with bolts 130 for securing the various parts together, and annular magnet 132 is apertured as shown for passage of the bolts. However, the upper face of the magnet is grooved in a general U-shape as at 134.

Work holding plate 136 is similar to plate 108, but at spaced intervals the inner part 138 is provided with legs 140 which extend to the magnet. These legs are in the shape of the area outlined by grooves 134 and are surrounded by sleeve-like gaps 142 which align with the grooves. Hence there is a fixed direct magnetic connection between the inner work plate member 138 and the magnet, of less section than the fixed connection between the outer work plate member and the magnet.

With the valve as in Fig. 8, a small flux circuit passes thru legs 140 from the magnet, directly into valve 121, and base 126, whereas the larger part of the flux is made useful by passing to the outer sides of grooves 134, into work plate part 136, over the gap, and thence into the valve. If, however, the valve is moved to the position shown in Fig. 9, the main part of the flux passes directly thru the outer plate part, around the legs and into the valve, without traversing the gap, but the flux in the legs 140 now cannot pass into the valve but must take the double loop circuit shown in broken lines, thus passing in a direction opposite to the work holding flux, in the work W.

It should be borne in mind that without a flux reversal, it is impossible to obtain a total release of the work, due to flux leakage, and therefore the construction shown in Figs. 4 and 6 will not fully release the work. As indicated above, it is sometimes desired not to fully release the work, and these applications are useful for such purposes. However, by providing a reverse flux of small magnitude in work release positions of the valves, as in Figs. 2, 8, and 9, a full release and partial demagnetization of the work is accomplished.

The constructions of Figs. 1-5 are adapted for manual operation of the valves, and those of Figs. 6-9 are adapted for mechanical control, as in automatic lathes, grinders, etc. The latter form of the invention is also useful in transfer and pick-up devices, as the chucks can be mounted on moving heads, etc., while having timed control devices for reciprocation of rods 120, 124.

Having thus described my invention and the advantages thereof, I do not wish to be limited to the details herein disclosed, otherwise than as set forth in the claims, but what I claim is:

1. A permanent magnetic chuck comprising a substantially annular bi-polar magnet, a work holding plate having a plurality of radial iron members spaced to form gaps, and a rotatable iron element located between said magnet and plate, said element having lands adapted to selectively engage certain of said iron members and effective to direct flux from said magnet into said certain members to the substantial exclusion of the other members, dependent upon its angular position, the opposite poles of the magnet being located axially with respect thereto.

2. A permanent magnetic chuck as recited in the preceding claim including a central iron support providing a return circuit for the flux, said magnet and rotatable element being mounted on the support.

3. A permanent magnet chuck as recited in the preceding claim but one including a central iron support, said magnet and rotatable element being mounted on said central iron support, the latter passing axially therethru, and including an axial non-magnetic sleeve between said support and said magnet and element.

4. A permanent magnet chuck comprising a pair of spaced magnetic conducting members forming a work holding surface, an annular bi-polar magnet, a fixed iron connection between one of said members and one pole of said magnet, said connection forming a support for the chuck, an iron element on said support, said element being relatively rotatable with respect to said members and providing means for selectively connecting either of said members with the other pole of said magnet, depending on the degree of said rotation, the opposite poles of the magnet being arranged in a generally axial direction with respect to the axis of the rotatable element.

5. A permanent magnet chuck comprising a pair of spaced magnetic conducting members forming a work holding surface, said members having interfitting radial pieces, a bi-polar magnet, a fixed iron connection between one of said members and one pole of said magnet, said iron connection forming a bearing, an iron element mounted for rotary motion on said bearing, and means on said element for selectively connecting the pieces of either member to the other pole of said magnet depending on the angular position of said element, the opposite poles of the magnet forming polar axes parallel to the axis of the rotary iron element.

6. A rotary permanent magnetic chuck comprising a pair of spaced magnetic conducting members forming a work holding surface, said members having interfitting parts arranged generally radially with respect to a point in said surface, a bi-polar annular magnet having a fixed connection to one member, and means effective to selectively magnetically connect the other pole of said magnet to either of said members, said means comprising a rotatable iron ring having lands for selective alignment with the parts of either member the polar axis of said annular magnet being parallel to the axis of the rotatable ring.

7. A permanent magnetic chuck as recited in the preceding claim wherein said iron ring is located between the magnet and work holding surface and is mounted for rotation relative to said members, and means secured to the ring extending to the periphery of the chuck for rotating the same.

8. A permanent magnetic chuck comprising a pair of magnetically spaced magnetic conducting members, said members being generally concentric and having interfitting radial parts, a bi-polar magnet, a magnetic conducting element connecting one pole of said magnet to one of said members and supporting the chuck, a magnetic conducting element mounted on said first-named element and being adapted for rotation thereon relative to said members, said second-named element forming a selective connection between the other pole of said magnet and either one of said members by means of spaced radial conductors adapted for contact with said parts, the poles of the magnet being arranged on a line parallel to the axis of said rotary element.

9. In a magnetic chuck, the combination of a work holding plate comprising a pair of generally concentric parts, substantially radial projections on one part, like recesses on the other part, said projections extending into said recesses, and said parts being insulated throughout; with a magnetic flux source and means between said source and plate effective to selectively pass or prevent passage of flux from said source to said radial projections on either part, said means comprising an iron ring having lands for alignment with the radial projections on either part.

10. A magnetic chuck as recited in the preceding claim wherein said plate presents a flat work holding surface, and said projections and recesses are so arranged as to terminate short of said surface so as to present a circular gap conformation of said parts at said surface.

11. A magnetic chuck as recited in the preceding claim but one wherein said plate presents two opposite flat faces, said projections and recesses being of relatively large extent on one face and extending angularly toward the center of the plate and terminating short of the other face to form a circular conformation of said parts.

12. A permanent magnetic chuck comprising at least two magnetic members forming a work holding plate, said members being insulated, an annular magnet, and a rotary magnetic element between said magnet and said plate and effective to connect a pole of said magnet to either of said members, said element having a non-magnetic rim insulating said magnet from said plate at the periphery of said chuck, said rim forming a hand-hold for rotating the element.

13. A magnetic holding device comprising a pair of magnetically insulated flux conducting members separated by magnetic insulation and forming a work holding surface, an annular bipolar magnetic flux source having a pole adjacent said members and a pole relatively remote therefrom, an iron support for the device located within said annular magnetic source and extending therethru and providing a direct flux path from said adjacent pole thru one member to said relatively remote pole, and a rotary iron element forming means selectively effective to cause said support to provide a flux path to said relatively remote pole from the other member and between said members, depending on the relative position of rotation of said element.

14. A magnetic holding device as recited in claim 13 wherein the support located within the annular magnetic source is magnetically insulated from the interior surface of the latter.

15. A permanent magnet chuck comprising an annular magnet having opposite parallel surfaces oppositely polarized, an iron element passing through the magnet and beyond its opposite surfaces, an iron plate magnetically connected to said element and one magnet pole at one side of the magnet, a plate having at least two magnetically separated parts to form a work surface at the opposite side of the magnet, one of said parts being magnetically connected to said element, and a rotary iron plate between the magnet and said two-part plate, said rotary plate being effective to selectively magnetically connect either of said parts with the other magnet pole.

JOHN T. BEECHLYN.